US012682325B2

(12) United States Patent
Bell-Geddes et al.

(10) Patent No.: US 12,682,325 B2
(45) Date of Patent: Jul. 14, 2026

(54) SYSTEM AND METHOD FOR AUGMENTED REALITY EFFECT CUSTOMIZATION IN SOCIAL MEDIA PLATFORMS THROUGH USER-UPLOADED MEDIA

(71) Applicants:Lemon Inc., Grand Cayman (KY); Beijing Zitiao Network Technology Co., Ltd., Beijing (CN)

(72) Inventors: Weston Bell-Geddes, Los Angeles, CA (US); Runze Zhang, Los Angeles, CA (US); Kewei Chen, Beijing (CN); Xiaocheng Tang, Los Angeles, CA (US); Zeyong Cai, Los Angeles, CA (US); Jianrong Ma, Beijing (CN); Runjia Tian, Los Angeles, CA (US)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 192 days.

(21) Appl. No.: 18/591,808

(22) Filed: Feb. 29, 2024

(65) Prior Publication Data
US 2025/0278900 A1 Sep. 4, 2025

(51) Int. Cl.
G06T 19/00 (2011.01)
G06Q 10/40 (2026.01)
G06T 19/20 (2011.01)

(52) U.S. Cl.
CPC ........... G06T 19/006 (2013.01); G06Q 10/40 (2026.01); G06T 19/20 (2013.01)

(58) Field of Classification Search
CPC .............................. G06T 19/006; G06T 19/20
See application file for complete search history.

(56) References Cited

U.S. PATENT DOCUMENTS

| | | | |
|---|---|---|---|
| 10,223,176 | B1 | 3/2019 | Chen et al. |
| 11,321,856 | B1 | 5/2022 | Caldwell et al. |
| 2018/0089895 | A1 | 3/2018 | Anderson |
| 2019/0156526 | A1* | 5/2019 | Liu ......................... G16H 30/40 |
| 2019/0213253 | A1* | 7/2019 | Ray ......................... G06N 20/00 |
| 2019/0272184 | A1* | 9/2019 | Rubenfield ........... G06T 19/006 |
| 2020/0151927 | A1* | 5/2020 | Guzman ................ G06V 20/20 |
| 2020/0159870 | A1 | 5/2020 | Bowen |
| 2020/0286161 | A1* | 9/2020 | Marguello ......... G06Q 30/0639 |

FOREIGN PATENT DOCUMENTS

| | | |
|---|---|---|
| CN | 112837406 A | 5/2021 |
| KR | 20210143529 A | 11/2021 |

OTHER PUBLICATIONS

International Search Report mailed Mar. 10, 2025 in International Application No. PCT/CN2024/138807.

* cited by examiner

*Primary Examiner* — Charles Tseng

(57) ABSTRACT

A system for customization of augmented reality (AR) effects is described. The operations performed by the system includes determining whether a user media texture has been uploaded and assign a user media texture index to the uploaded media texture asset. The indexed uploaded media texture asset is provided and AR effect on digital content is deployed.

20 Claims, 7 Drawing Sheets

310

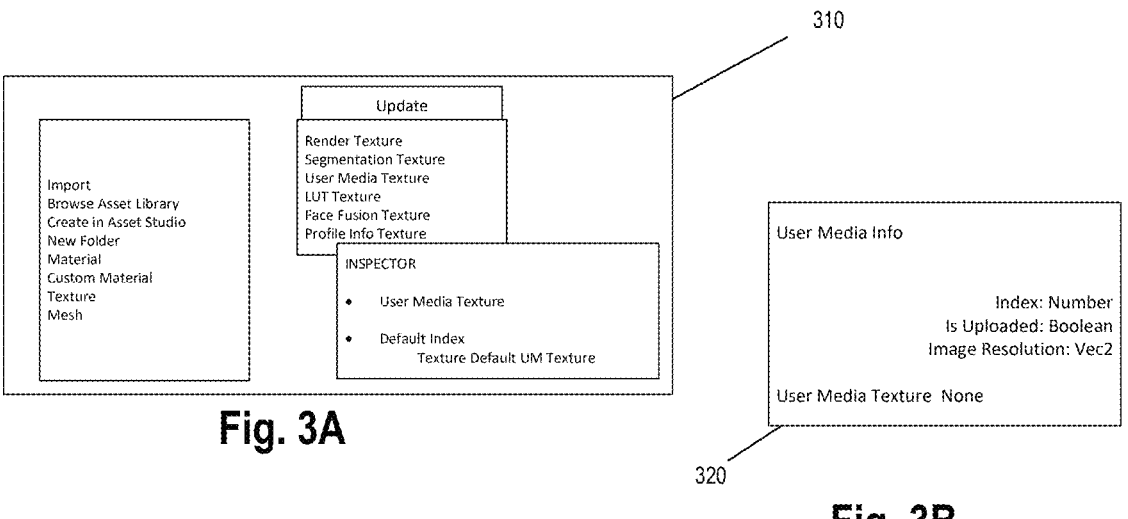

Update

Render Texture
Segmentation Texture
User Media Texture
LUT Texture
Face Fusion Texture
Profile Info Texture Import
Browse Asset Library
Create in Asset Studio
New Folder
Material
Custom Material
Texture
Mesh

INSPECTOR

•   User Media Texture

•   Default Index
    Texture Default UM Texture

Fig. 3A

User Media Info

Index: Number
Is Uploaded: Boolean
Image Resolution: Vec2

User Media Texture   None

SYSTEM AND METHOD FOR AUGMENTED REALITY EFFECT CUSTOMIZATION IN SOCIAL MEDIA PLATFORMS THROUGH USER-UPLOADED MEDIA

BACKGROUND

Augmented Reality (AR), an interactive experience that layers virtual assets on the real world, is seeing rapid growth across industries including gaming, entertainment, education, and marketing. Various social media and video hosting platforms have leveraged AR technologies to enhance user engagement through diverse AR effects integrated into user-generated content.

The current AR paradigm primarily allows effect creators to use a pre-defined set of textures and media to build AR effects, usually embedded within the AR development software. While this creates virtually engaging AR effects, the current AR paradigm is restricting user personalization and content diversity, thus limiting the overall user experience.

Additionally, the existing AR effect creation process does not permit users to incorporate their unique images into the AR effects, restricting personalization, diversity, and storytelling potential within the AR realm. Moreover, effect creators lack a streamlined method to obtain crucial information on, for example, user-uploaded images, index, upload status, and resolution. Such shortcomings impend the creation of truly dynamic and personalized AR effects.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to augmented reality (AR) effects and digital content creation for social media application. The present disclosure specifically addresses limitations in the existing tools used for AR content creation within AR engines on social media platforms. The present disclosure fundamentally expands the personalization and diversity possibilities of AR effects by allowing more interactive engagement between effect creators and users.

The primary technical challenge being addressed by the present disclosure is the limited ability of effect creators to offer personalization options in AR effects. In the existing setup, the capacity for users to incorporate unique, personal images into AR effects is restricted. The effect creators are currently limited in their capacity to incorporate unique, personal images into AR effects, commonly known as the "green screen" effects. Such limitation impedes the diversity of content, reduces storytelling potential, and impacts overall user engagement within the social media or video hosting applications.

To address such problems, the present disclosure introduces the innovative "User Media" feature, which enables effect creators to integrate custom media files and textures into their AR effects. Crucially, these media files and textures serve as designated areas where users can upload their own personal images. This expands the potential for content personalization in an unprecedented way, enabling a much deeper user interaction within AR effects.

In conjunction with this, the present disclosure comprises an asset called "User Media Texture." This asset assigns an index to each uploaded texture, which allows effect creators to manage the uploaded files more efficiently. The "User Media Texture" also provides useful information about the uploaded images, such as image resolution, upload status, and index.

Furthermore, the present disclosure introduces a node called "User Media Information (hereinafter "User Media Info") Node." The User Media Info node allows the user to get information about the user uploaded images.

By facilitating a higher degree of customization, versatility, and user interaction, the present disclosure enhances the diversity of AR effects and storytelling potential on social media and video hosting platforms. The present disclosure heralds a significant advance in digital content creation, encouraging user creativity, personalization, and engagement. Consequently, the present disclosure addresses a substantial gap in the AR effect creation space and marks a pivotal stride in the evolution of the AR content creation realm.

The present disclosure offers a solution to current difficulties of incorporating personalized content in AR effects. The present disclosure involves a novel method to upload images from a user's device to be used as two-dimensional (2D) textures in AR effects, which can be applied to both 2D and three-dimensional (3D) objects. This method provides the effect creators with the ability to enrich the diversity of their effects, leading to an increase in user engagement and content posting on social media and video hosting platforms.

In some aspects, a customization for AR effect system is provided. The system comprises steps for determining whether a User Media Texture Asset has been uploaded. Assigning a user media texture index to the uploaded User Media Texture Asset. The indexed User Media Texture Asset is provided and AR effect on digital content is deployed.

In some aspects, the user media texture index operates as a customized texture within the AR effect and the customized texture is applied on a 2D object and a 3D object in an AR environment.

In some aspects, a user media texture integrated into an AR effect project, such that an activation of the AR effect triggers a media picker interface for the user.

In some aspects, the user media texture asset assigns a unique index to each uploaded image, thereby correlating with the index of the picker on the user's device.

In some aspects, a default texture parameter within the user media texture asset displayed preemptively in the media picker interface prior to user media selection.

In some aspects, a user media info node provided within a visual scripting graph, which enabling access to detailed information regarding the user uploaded images.

In some aspects, inputs for the user media info node comprise a texture2D, wherein the output of the texture2D comprising an image index number, a Boolean indicating uploaded status, and precise image resolution.

In some aspects, the texture2D input is derived from the user uploaded images via the user media texture asset.

In some aspects, an output index number is a numerical value indicating a sequence in which the images were uploaded by the user.

In other aspects, an output Boolean value provides a real-time status of whether an image has been uploaded via the user media texture asset.

In some aspects, an output image resolution is provided as a Vec2 (a two-dimensional vector) encapsulating a width and a height of the user uploaded media images.

In some aspects, after the user uploaded media images have been incorporated into a posted video, the user uploaded media images are available for inheritance, thereby enabling another user who interacts with a same AR effect to inherit the user uploaded media images.

In some aspects, the inheritance option is moderated by enabling or disabling an AR effect creator.

In some aspects, the system further comprising setting the user media texture index is set to one when there is no pre-existing media texture has been uploaded, the user media texture index is incremented by one when the media texture has been uploaded, determine whether there is a user media texture having a lower index than the user media texture to be deleted, and deleting, the assigned user media texture index.

In some aspects, the user media texture index does not change when it is determined that there is the user media texture having a lower index.

In some aspects, the user media texture index is reassigned when it is determined that there is no user media texture having a lower index.

In some aspects, a method for enabling customization of AR effects is provided. The method comprising selecting, by a user, an image to upload, assigning a media texture index to the uploaded image, editing the uploaded image, and providing the edited image as an AR effect.

In some aspects, an effect creator can edit the uploaded image using a user media texture function and a user media information node function.

In some aspects, another user can inherit the provided AR effect.

In some aspects, the effect creator can enable or disable the inheritance of the provided AR effect.

In another aspect, a non-transitory computer-readable storage medium is provided. The—transitory computer-readable storage medium stores computer-readable instructions that, when executed by one or more processors, cause the one or more processors to: determine a user media texture asset has been uploaded; upload the user media texture asset to a social media platform; assign a user media texture index to the uploaded user media texture asset; provide the indexed user media texture asset; and deploy AR effect on digital content.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 3A shows an example user media texture, according to an example embodiment.

FIG. 3B shows an example user media info node, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In view of the shortcomings in existing approaches for AR content creation, there is a strong demand for a method that permits greater user input in AR effects, allowing users to upload their own images to use as textures in AR effects, and providing effect creators with a manageable way to manipulate these user-uploaded images.

The present disclosure describes various examples of an image effect generation system in an augmented reality (AR) effects and digital content creation. The AR effect creation system generates output such as 2D images and textures, using user media tools. Generally, the AR effect creation system captures an image selected by a user for editing and uploads onto a social media or video hosting platform. More specifically, the AR effect creation system allows the user to select images from the user's own datastore and upload such selected images to be used as a background texture, instead of incorporating a pre-loaded background image from the social media datastore. Advantageously, the AR effect creation system of the present disclosure enhances the user's engagement and creativity.

Figure 1:
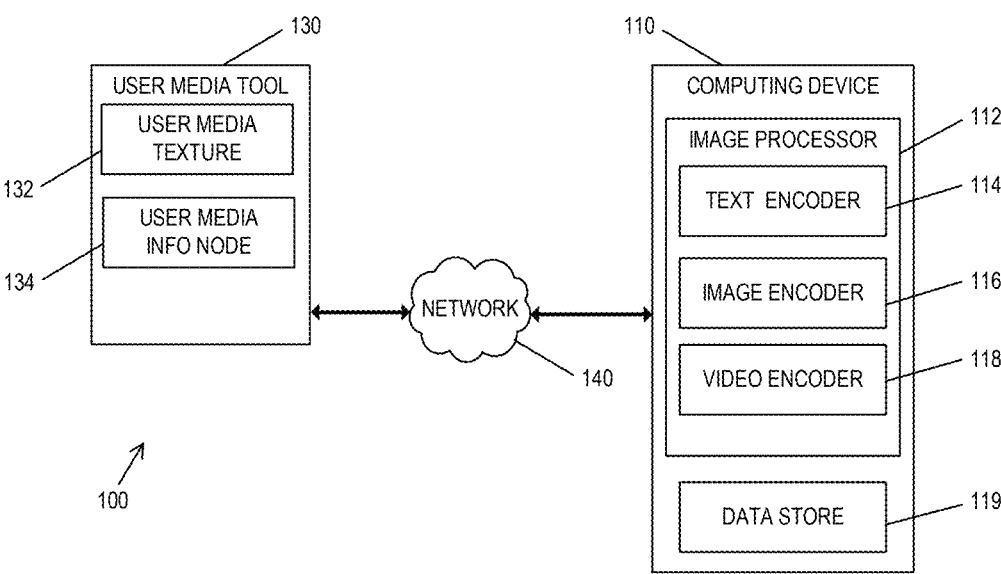
FIG. 1 shows a block diagram of an example of an AR effect creation system, according to an example embodiment.

This and many further embodiments for a computing device are described herein. For instance, FIG. 1 shows a block diagram of an example of an AR effect creation system 100, according to one or more embodiments. The AR effect creation system 100 is configured to generate a background texture based on a user provided image. In some examples, the AR effect creation system 100 is used by a content creator and provided as an extension of an existing application. In some examples, the AR effect creation system provides a 2D texture based on the user provided image.

In an embodiment, the system 100 includes a computing device 110 that is used to provide the images. The computing device 110 includes an image processor 112, which is configured to process images for the AR effect creation system 100. The system 100 may also include a user media tool 130 that is configured to process the image provided by the user, in some examples. In some examples, the image processor 112 includes text encoder 112, image encoder 116, and video encoder 118 for the image processor 112. In some examples, the computing device 110 further includes a data store 118.

In an example, the text encoder 112, the image encoder 116, and the video encoder 118 may be used to edit an image and/or video that the user selects for upload.

The user media tool 130 may include a user media texture 132, in an embodiment. The user media texture 132 is an asset added to a project by the effect creators. When the user media texture 132 is integrated into a social media application, the media picker is automatically triggered in the application when the user opens an effect.

The computing device 110 may be any type of computing device, including a smartphone, mobile computer or mobile computing device (e.g., a laptop computer, a notebook computer, a tablet computer, a netbook, etc.), or a stationary computing device such as a desktop computer or PC (personal computer). The computing device 110 may be configured to communicate with a social media platform, cloud processing provider, software as a service provider, or other suitable entity, for example, using social media software and a suitable communication network. The computing device 110 may be configured to execute one or more software applications (or "applications") and/or services and/or manage hardware resources (e.g., processors, memory, etc.), which may be utilized by users of the computing device 110.

In the example shown in FIG. 1, the image processor 112 includes a text encoder 116 and a view encoder 114. In other examples, the text encoder 116 and the view encoder 114 may be formed as a combined processor. In some examples, at least some portions of the text encoder 116 and the view encoder 114 may be combined with the neural network model 118, for example, by including a neural network processor or other suitable processor configured to implement a neural network model. In other words, the neural network model 118 may be integral with the text encoder 116 and the view encoder 114 and implemented with, or as, a neural network processor. In some examples, the neural network model 118 is omitted from the computing device 110 and the neural network model 128 is utilized instead.

Data store 119 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The data store 119 may store the images created by the user media tool 130. In some examples, the user may select the image created by the user media tool 130 to be used as the background texture for their social media posts.

Network 140 may comprise one or more networks such as local area networks (LANs), wide area networks (WANs), enterprise networks, the Internet, etc., and may include one or more of wired and/or wireless portions. Computing device 110 and data store 120 may include at least one wired or wireless network interface that enables communication with each other (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

Figure 2A:
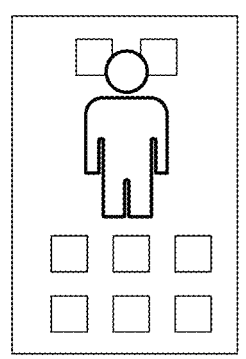
FIGS. 2A and 2B show an example user created social media post according to the prior art.
Figure 2B:
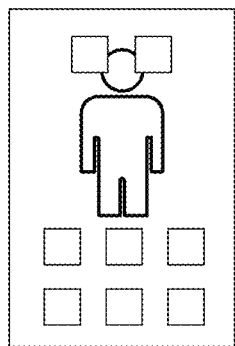

FIGS. 2A and 2B show examples of social media posts created by a user according to the prior art. In FIG. 2A, a facial image of the user is in a foreground covering portions of background image. In FIG. 2B, a facial image of the user is in a background, in which, the facial image is covered by a foreground image. The created image may then be uploaded onto social media. The user can upload multiple images for a wide variety of use cases, including but not limited to, background, texture, material on an object, and material on a 3D object. Of those use cases, background use is the most highly performing effect.

FIG. 3A shows a user media texture 310 (which may correspond to the user media texture 132 shown in FIG. 1) according to an example embodiment of the present disclosure. The user media texture 310 may also include an index and a default texture. The default texture may be a green background, which indicates to the user that a background needs to be uploaded. In some examples, the index is assigned to every uploaded image. Each index corresponds to an index of a media picker on the user's device. This allows user to upload multiple images as each image is assigned a unique index value. This helps the user to identify the order of the images which the user is uploading and to determine how many user media textures have been uploaded. The index also serves to identify which texture is on which user media texture asset. In some examples, the user may upload multiple images simultaneously, in which the simultaneously uploaded images may be assigned corresponding index values in sequence. The index value is determined by a user media tool engine. In some examples, the index changes if one of the user-uploaded media picker texture is deleted. In another example, the default texture is a parameter and is displayed by default in the media picker before the user selects any media to upload from their device. In some examples, the default texture can be an image or a placeholder graphic that provides visual guidance to the user. In some examples, when the user selects the media file, the default texture is replaced with the selected content.

In some examples, the user may add the user media texture 310 from a texture menu. The user media texture 310 has the index and the default index menu items. In another example, the user may select a user media texture from a segmentation menu to set the user media texture (e.g., a default green background) as a backdrop. A preview screen may be provided on a social media platform using a QR code (not shown). The user may then select any single image or multiple images from a list of images on the user application and upload the selected images as the background. In some examples, the uploaded image may be used as a texture on a 3D asset (e.g., a 3D object), a face fusion texture, or on similar assets.

In another example, user media tool 130 may also include a user media info node 320 (which may correspond to the user media info node 134 shown in FIG. 1).

FIG. 3B shows the user media info node 320. The user media info node 320 is included in a visual scripting system (not shown). The user media info node 320 is a tool used by the effect creators which allows the effect creators to access information about the user-uploaded images. In some examples, the user media info node 320 inputs a Texture2D, outputs index number, a Boolean indicating upload status, and image resolution as a Vector2 (hereinafter "Vec2"), as described below.

In some examples, the user media info node 320 inputs the Texture2D. The input for the user media info node 320 is a Texture 2D. The Texture2D is a 2D texture type that is applied to various surfaces of objects within the AR effects. The Texture2D is derived from the user-uploaded images through the user media texture asset.

In some examples, the user media info node 320 outputs in Boolean (e.g., Is Uploaded). In some examples, the Boolean value indicates whether a Texture2D has been uploaded via the user media texture asset. In some examples, if the image has been uploaded, the output returns True and if the image has not been uploaded, the output returns False.

In another example, this output allows the effect creator to add conditional logic based on upload status of an image.

In another example, the user media info node 320 outputs Vec2 (e.g., Image Resolution), which indicates a resolution of the user-uploaded image in a two-dimensional vector (e.g., x-y axis). This vector represents a width and a height of the user-uploaded image, respectively. If no image has been uploaded, the output defaults to a Vec2 value of (0,0). The Vec2 allows the AR effect creator to dynamically adjust the visual characteristics of AR effects based on the resolution of the user-uploaded images.

Figure 4:
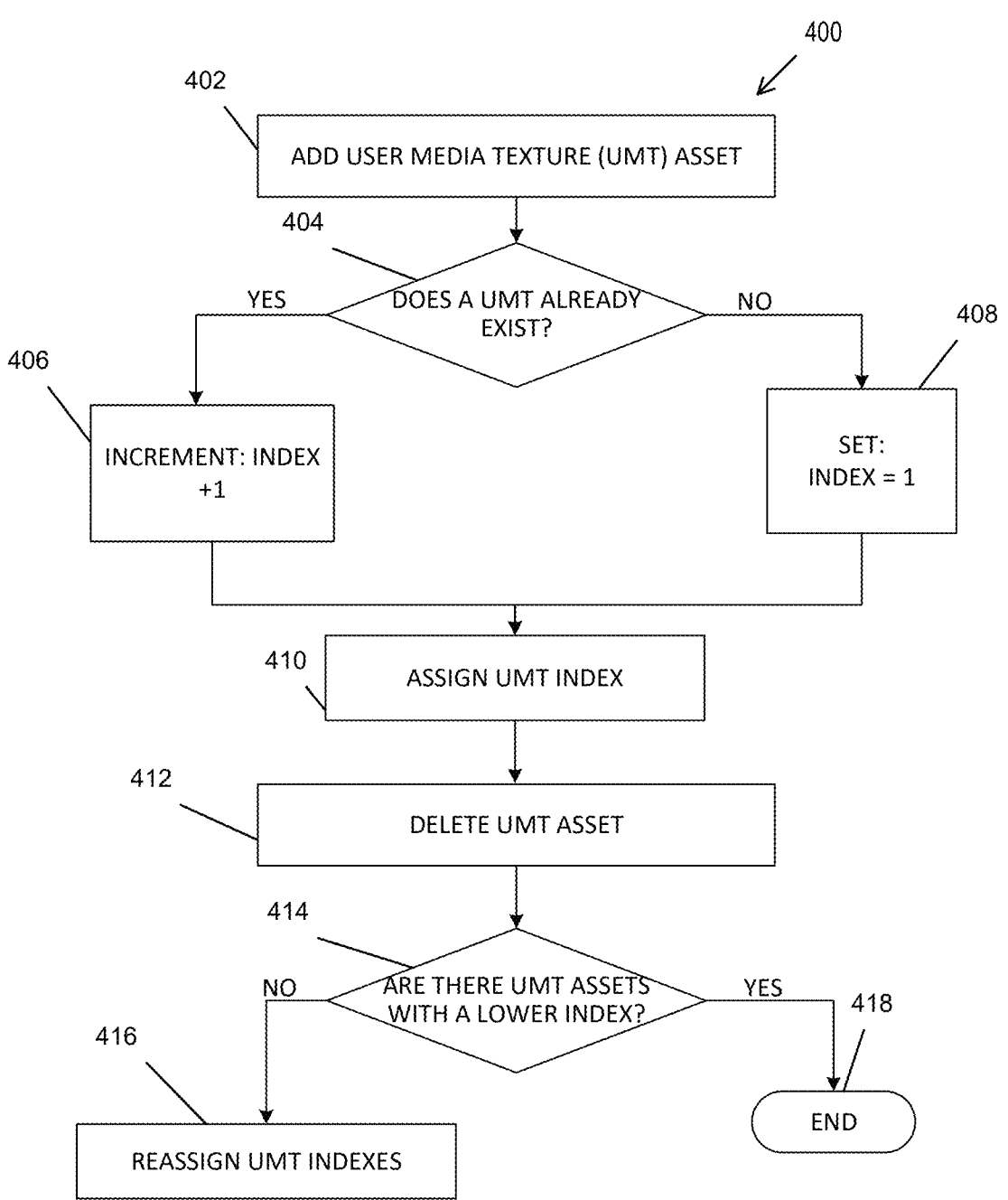
FIG. 4 shows a flowchart of an example method for processing a user-uploaded image, according to an example embodiment.

FIG. 4 shows a flowchart of an example method 400 for processing the user-uploaded image, according to an example embodiment. In an embodiment, one or more steps of the example method 400 may be repeated, perhaps with different parameters or data to operate on. In an embodiment, one or more steps of the example method 400 may be performed in a different order than the top-to-bottom order that is shown in FIG. 4. One or more steps of the example method 400 may be performed serially, in a partially overlapping manner, or fully in parallel. Thus, the order in which the steps of method 400 are performed may vary from one performance of the process to another performance of the process. One or more steps of the example method 400 may also be omitted, combined, renamed, regrouped, be performed on one or more machines, or otherwise depart from the illustrated flow, provided that the process performed is operable and conforms to at least one claim. In an embodiment, one or more steps of the example method 400 shown in FIG. 4 may be performed by the computing device 110 (e.g., via the image processor 112), the user media tool 130, or other suitable computing device.

Method 400 begins with step 402. At step 402, the user selects an image to upload to a User Media Texture Asset (hereinafter "UMT Asset"). In some examples, the user may select the image from available images in the datastore 119. In another example, the user may take a new image and upload the newly taken image.

At step 404, when the image is uploaded, is it is determined whether the UMT Asset already exists. If it is determined that the UMT Asset already exists (e.g., YES at step 404), then an index is incremented by 1 (INDEX+1) at step 406. If it is determined that the UMT Asset does not exist (e.g., NO at step 404), then the index is set to 1 (INDEX=1) at step 408.

In an embodiment, the uploaded images can also be inherited by other users. Once images are uploaded and video(s) with effects created using those images are posted on social media platforms, the system allows other users to use the effects to inherit those created effects. Such inheritance option can be enabled or disabled by the effect creator.

At step 410, an UMT index is assigned according to the index number determined at step 404.

At step 412, the assigned UMT index at step 410 is deleted by the user. If deletion operation is detected, the process proceeds to step 414.

At step 414, a UMT assets having a lower index than the UMT Asset that is selected to be deleted. If it is determined that there is a UMT Asset that has a lower index than the UMT Asset that is to be deleted (e.g., YES at step 414), then other indexes will remain the same (e.g., not reassigned) at step 418. If it is determined that there is no UMT Asset that has a lower index than the UMT Asset that is to be deleted (e.g., NO at step 414), then other indexes will be reassigned (e.g., changed) at step 416.

Figure 5:
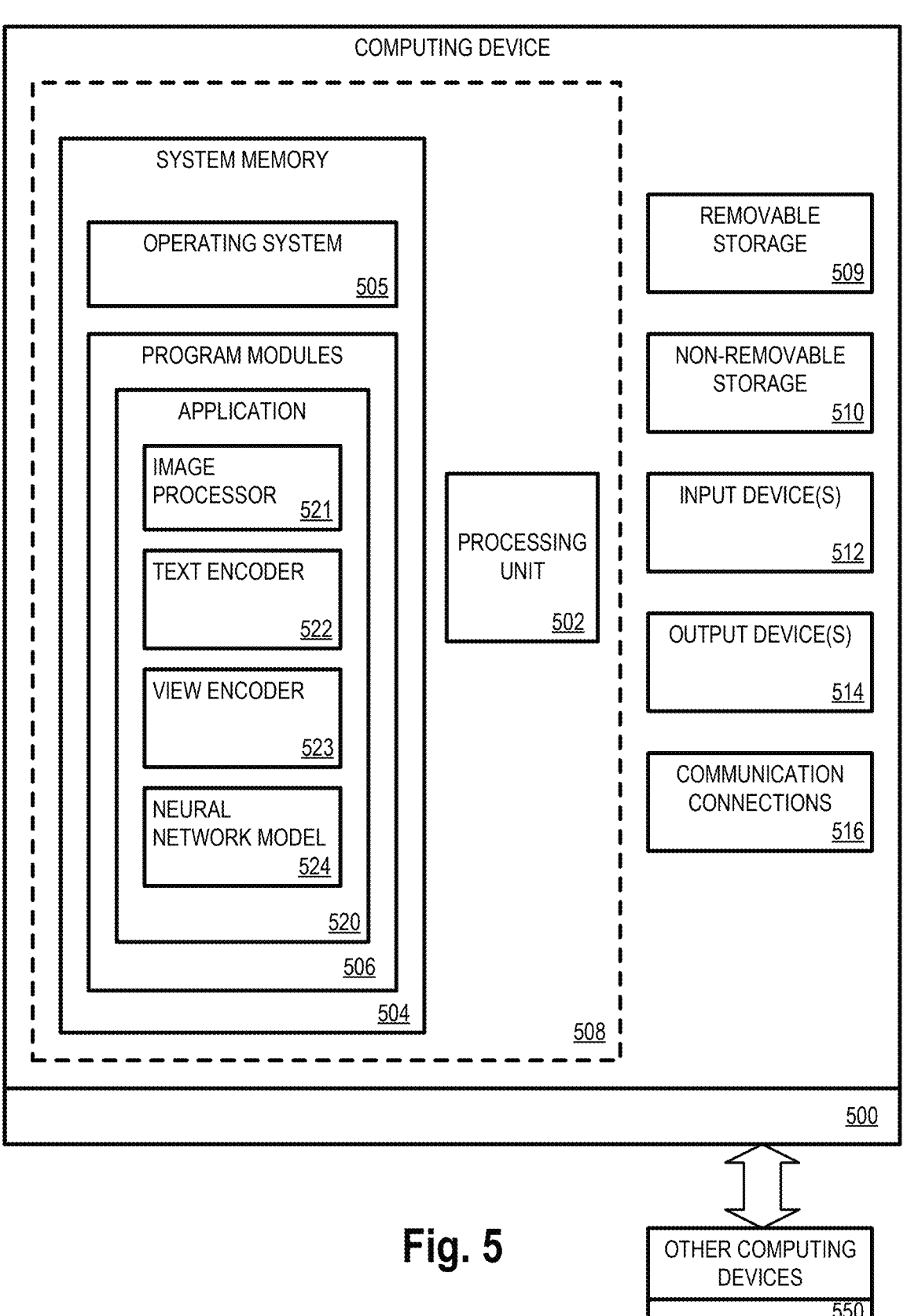
FIG. 5 is a block diagram illustrating example physical components of a computing device with which aspects of the disclosure may be practiced.
Figure 6:
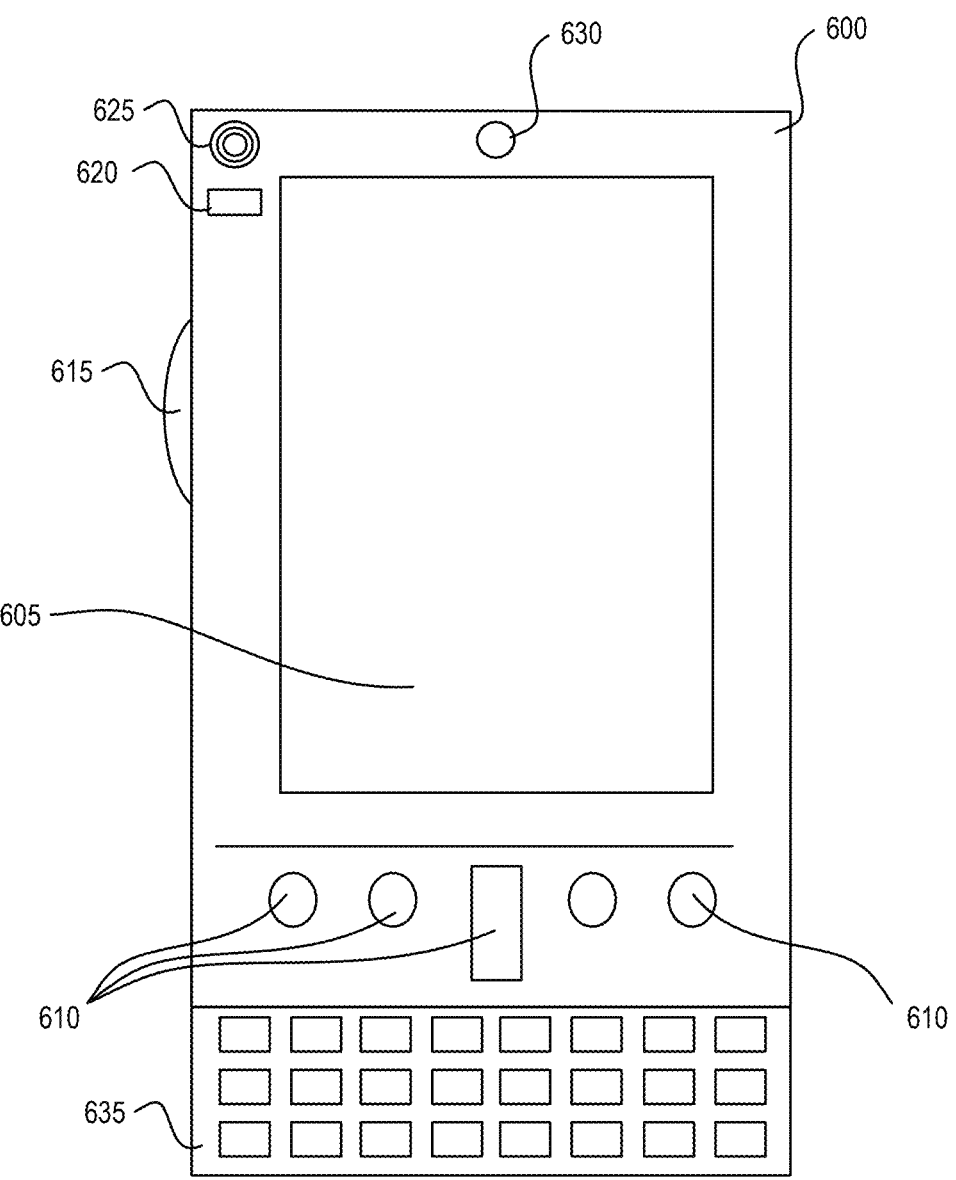
FIGS. 6 and 7 are simplified block diagrams of a computing device with which aspects of the present disclosure may be practiced.

FIGS. 5 and 6 and the associated descriptions provide a discussion of a variety of operating environments in which aspects of the disclosure may be practiced. However, the devices and systems illustrated and discussed with respect to FIGS. 5 and 6 are for purposes of example and illustration and are not limiting of a vast number of computing device configurations that may be utilized for practicing aspects of the disclosure, as described herein.

FIG. 5 is a block diagram illustrating physical components (e.g., hardware) of a computing device 500 with which aspects of the disclosure may be practiced. The computing device components described below may have computer executable instructions for implementing an image processor application 520 on a computing device (e.g., computing device 110), including computer executable instructions for image processor application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running image processor application 520, such as one or more components with regard to FIG. 1, and, in particular, image processor 521 (e.g., corresponding to image processor 112), text encoder 522 (e.g., corresponding to text encoder 116), view encoder 523 (e.g., corresponding to view encoder 114), and neural network model 524 (e.g., corresponding to neural network model 118).

The operating system 505, for example, may be suitable for controlling the operation of the computing device 500. Furthermore, examples of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., image processor application 520) may perform processes including, but not limited to, the aspects, as described herein. Other program modules that may be used in accordance with aspects of the present disclosure, and in particular for training an image processor, may include image processor 521, prompt processor 522, augmentation processor 523, and/or neural network model 524.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned")

onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 6 illustrates a mobile computing device 600, for example, a mobile telephone, a smart phone, wearable computer (such as a smart watch), a tablet computer, a laptop computer, and the like, with which examples of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may include a front-facing camera 630. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

Figure 7:
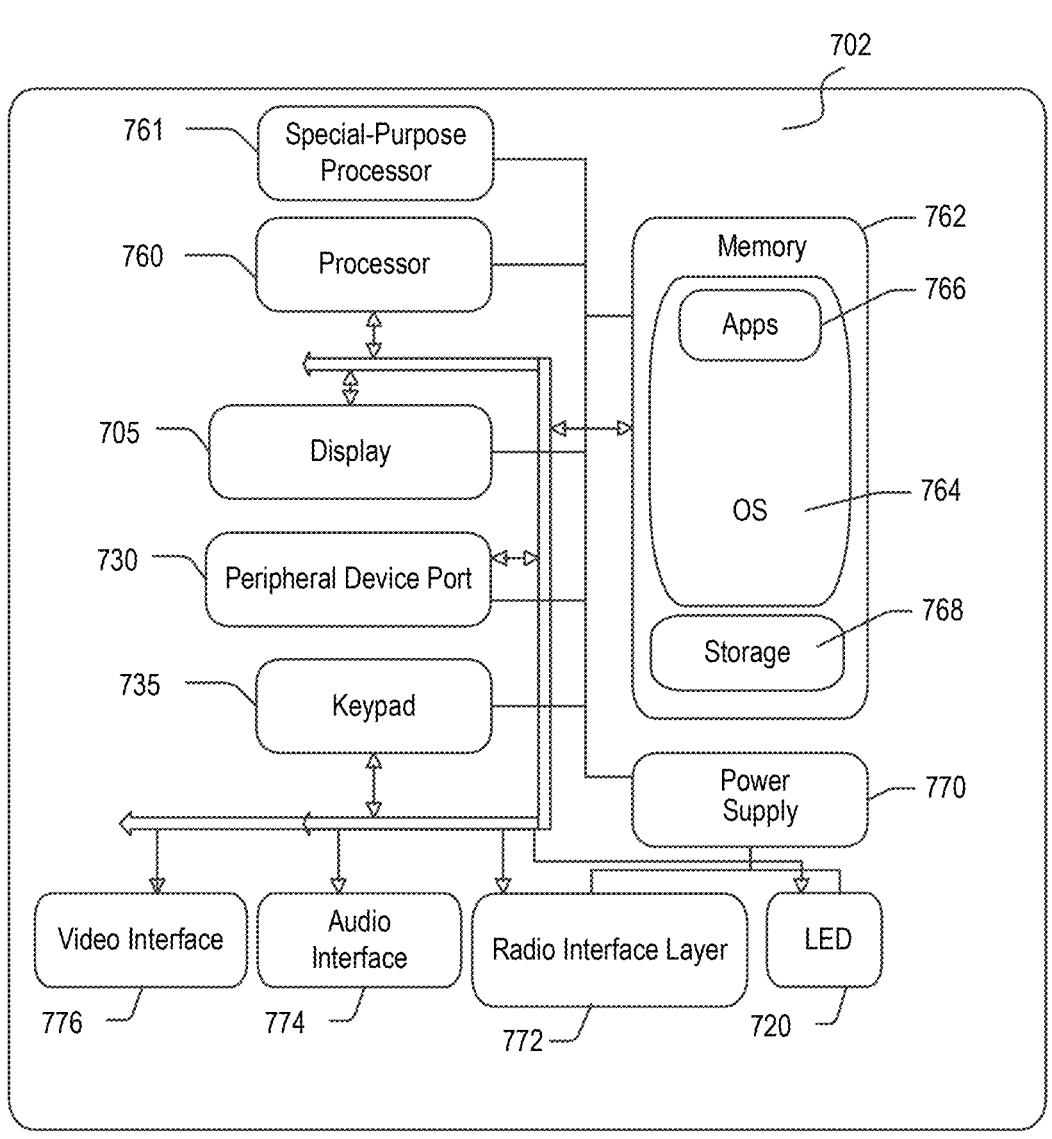

FIG. 7 is a block diagram illustrating the architecture of one aspect of a mobile computing device. That is, the mobile computing device 600 can incorporate a system (e.g., an architecture) 702 to implement some aspects. In one example, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone. The system 702 may include a display 705 (analogous to display 605), such as a touch-screen display or other suitable user interface. The system 702 may also include an optional keypad 735 (analogous to keypad 635) and one or more peripheral device ports 730, such as input and/or output ports for audio, video, control signals, or other suitable signals.

The system 702 may include a processor 760 coupled to memory 762, in some examples. The system 702 may also include a special-purpose processor 761, such as a neural network processor. One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer.

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 625 (e.g., audio transducer 625 illustrated in FIG. 6). In the illustrated example, the visual indicator 820 is a light emitting diode (LED) and the audio transducer 625 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with examples of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 600 implementing the system 702 may have additional features or functionality. For example, the mobile computing device 600 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 600 and stored via the system 702 may be stored locally on the mobile computing device 600, as described above, or the data may be stored on any number of storage media that may be accessed by the device via the radio interface layer 772 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 6 and 7 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or micro-controller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, sub-combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A system for enabling customization of an augmented reality (AR) effect, the system comprising:
   a processor and device-storage media having executable instructions which, when executed by the processor, cause the system to perform operations comprising:
      determining a user media texture asset has been uploaded;
      uploading the user media texture asset to a social media platform; and
      assigning a user media texture index to the uploaded user media texture asset;
      setting the user media texture index to one when no pre-existing media texture asset has been uploaded;
      incrementing the user media texture index by one when the uploaded user media texture asset has been uploaded;
      determining whether there is at least one user media texture asset having a lower index than the indexed user media texture asset to be deleted; and
      deleting the user media texture index,
      wherein the indexed user media texture asset is provided and the AR effect on digital content is deployed.

2. The system of claim 1, wherein the uploaded user media texture asset operates as a customized texture within the AR effect; and
   the customized texture is applied on a two-dimensional (2D) object and a three-dimensional (3D) object in an AR environment.

3. The system of claim 1, further comprising:
   a user media texture integrated into an AR effect project, such that an activation of the AR effect triggers a media picker interface for a user.

4. The system of claim 3, wherein the uploaded user media texture asset assigns a unique index to each uploaded image, thereby correlating with an index of the media picker interface on the user's device.

5. The system of claim 3 further comprising:
   a default texture parameter within the uploaded user media texture asset displayed preemptively in the media picker interface prior to user media selection.

6. The system of claim 5, wherein the user media texture index is reassigned upon determination that there is no user media texture asset having a lower index.

7. The system of claim 1 further comprising:
   a user media info node provided within a visual scripting graph, which enables access to detailed information regarding user uploaded images.

8. The system of claim 7, wherein inputs for the user media info node comprise a texture2D, wherein output of the texture2D comprises an image index number, a Boolean indicating uploaded status, and precise image resolution.

9. The system of claim 8, wherein input for the texture2D is derived from the user uploaded images via the uploaded user media texture asset.

10. The system of claim 8, wherein an output index number is a numerical value indicating a sequence in which the user uploaded images were uploaded by the user.

11. The system of claim 8, wherein an output Boolean value provides a real-time status of whether an image has been uploaded via the uploaded user media texture asset.

12. The system of claim 8, wherein an output image resolution is provided as a Vec2 (a two-dimensional vector) encapsulating a width and a height of the user uploaded media images.

13. The system of claim 1 wherein after user uploaded media images have been incorporated into a posted video, the user uploaded media images are available for inheritance, thereby enabling another user who interacts with a same AR effect to inherit the user uploaded media images.

14. The system of claim 13, wherein an inheritance option is moderated by enabling or disabling an AR effect creator.

15. The system of claim 1, wherein the user media texture index does not change upon determination that the indexed user media texture asset having a lower index.

16. A method for enabling customization of augmented reality (AR) effects, the method comprising:

uploading an image to a social media platform;

assigning a media texture index to the uploaded image;

editing the uploaded image;

setting the media texture index to one when no pre-existing image has been uploaded;

incrementing the media texture index by one when the uploaded image has been uploaded;

determining whether there is at least one image having a lower index than the indexed image to be deleted;

deleting the media texture index; and providing the edited image as an AR effect.

17. The method of claim 16, wherein an effect creator can edit the uploaded image using a user media texture function and a user media information node function.

18. The method of claim 17, wherein another user can inherit the provided AR effect.

19. The method of claim 18, wherein the effect creator can enable or disable the inheritance of the provided AR effect.

20. A non-transitory computer-readable storage medium storing computer-readable instructions that, when executed by one or more processors, cause the one or more processors to:

determine a user media texture asset has been uploaded;

upload the user media texture asset to a social media platform;

assign a user media texture index to the uploaded user media texture asset;

provide the indexed user media texture asset;

set the user media texture index to one when no pre-existing media texture asset has been uploaded;

increment the user media texture index by one when the uploaded user media texture asset has been uploaded;

determine whether there is at least one user media texture asset having a lower index than the indexed user media texture asset to be deleted;

delete the user media texture index; and deploy an augmented reality (AR) effect on digital content.

* * * * *